United States Patent [19]
Alexander

[11] 3,848,849
[45] Nov. 19, 1974

[54] FLUID CONTROL VALVE
[75] Inventor: William H. Alexander, Houston, Tex.
[73] Assignee: Vapor Corporation, Chicago, Ill.
[22] Filed: June 29, 1973
[21] Appl. No.: 375,082

[52] U.S. Cl. ................ 251/314, 251/175, 251/358
[51] Int. Cl. ............................................. F16k 5/20
[58] Field of Search ........... 251/309, 310, 311, 312, 251/314, 315, 316, 317, 355–365, 170, 171, 172, 175

[56] References Cited
UNITED STATES PATENTS

| 3,408,038 | 10/1968 | Scaramucci | 251/317 X |
|---|---|---|---|
| 3,504,885 | 4/1970 | Hulsey | 251/172 |
| 3,521,855 | 7/1970 | Jensen | 241/315 X |
| 3,556,474 | 1/1971 | Scaramucci | 251/315 X |
| 3,584,641 | 6/1971 | Milleville | 251/172 X |
| 3,656,498 | 4/1972 | Grove et al. | 251/172 X |
| 3,729,015 | 4/1973 | Oliver | 251/315 X |
| 3,749,357 | 7/1973 | Fowler | 251/315 X |
| 3,760,833 | 9/1973 | Kemp et al. | 251/315 X |
| 3,776,506 | 12/1973 | Fowler et al. | 251/315 X |

Primary Examiner—Charles J. Myhre
Assistant Examiner—Ira S. Lazarus
Attorney, Agent, or Firm—Lloyd L. Zickert

[57] ABSTRACT

A valve of the top entry type, having a unique sealing seat structure which includes a rigid base and a resilient sealing face, together with load bearing inserts for limiting the forces between the plug and the seat. The seats are mounted in the valve structure so that line pressure acts to force the seats against the plug in sealing relation therewith.

26 Claims, 13 Drawing Figures

FLUID CONTROL VALVE

This invention relates in general to a fluid control valve usable to control the flow of fluids in a line and more particularly to a valve having uniquely constructed seats to facilitate the functioning of the valve.

While the seat construction of the invention is illustrated on a valve employing a cylindrical plug, the features of this invention can be applied with equal advantage to valves using other plug designs.

The valve of the present invention can be repaired in line, is structured so that it can be easily lubricated, is structured with a seat that facilitates long life and which assists in permitting low torque operation consistently throughout its life, and employs a seat configuration which maintains constant contact with the plug to prevent foreign matter from entering the sealed surface areas.

The valve includes a valve body defining a cavity within which a plug is rotatably mounted although other valve configurations could be used as well. The plug illustrated is cylindrical and includes a fluid passageway extending transaxially. Inlet and outlet ports, which are identical in size and structure, are co-axially aligned and also in alignment with the passageway through the plug so that when the passageway coaligns with the ports, the plug is in open position and permits full communication between the ports. Seats are provided at the ports coacting with the plug to seal the valve cavity. These seats are generally cylindrical in form with a passageway extending therethrough that coaligns with the ports and therefore extends perpendicular to the rotational axis of the plug. The ends of the seats which engage the plug are arcuately formed or saddle shaped to mate with the outer cylindrical surface of the plug. The seats include a metal or other rigid material base with a face made of resilient material bonded to the ends engaging the plug. The resilient face of this design is defined by inner and outer seal lips in spaced relation at the inner and outer edges of a rigid base which, as now can be appreciated, is essentially annular or ring-shaped. The lip seals have ribbon-like sealing surfaces engaging the plug. In order to limit the forces applied between the seats and the plug and therefore reduce the unit stresses being applied to the elastomeric lip seals, bearing pads are mounted on the ends of the seats facing the plug. These inserts have bearing surfaces conforming to the plug surfaces and which are slightly recessed from the sealing surfaces of the lip seals. O-rings or similar seal devices are provided to effect a seal between the seats and the valve body. The relationship between the structure of the seats and the seat cavities in the valve body is such that line pressure acts against the seats to force them into sealing engagement with the plug. The seats are capable of sealing the valve bubble tight over a wide range of pressures. Further, the seat construction enables the valve to be used for block and bleed or double block and bleed service.

It is therefore an object of the present invention to provide a new and improved valve capable of being repaired in line to facilitate maintenance.

Another object of this invention is in the provision of a new and improved sealing seat for a valve which includes flexible lip seals and bearing pads enabling bubble-tight sealing function.

Another object of this invention is in the provision of a new and improved plug valve with unique seats that greatly enhance the life of the valve and which permit easy operation in service with consistently low operating torque requirements.

A still further object of this invention is in the provision of a new and improved plug valve having unique seats facilitating secondary lubrication for sealing and servicing and which permit double block and bleed with a single seat.

Another object of this invention is in the provision of a new and improved plug valve including unique seat structures coacting to enable the valve to be used for block and bleed or double block and bleed service.

Other objects, features and advantages of the invention will be apparent from the following detailed disclosure, taken in conjunction with the accompanying sheets of drawings, wherein like reference numerals refer to like parts, in which:

The plug valve of the present invention is intended to be used primarily as a shut-off valve in pipelines handling the flow of liquids. It is readily apparent that the valve may be made in various sizes such as used in constructing large pipelines. Depending upon the operating conditions, valves of this type require periodic maintenance. When the maintenance involves the replacement of seals and seats, the valve of the present invention is constructed so that it may be repaired while in line to thereby reduce the down time of the valve by eliminating the time it would take if the valve had to be removed from the line for repair.

The valve includes resilient seals which seal over a wide pressure range. Further, the valve includes structural features which facilitate secondary lubrication for sealing and servicing.

Figure 1:
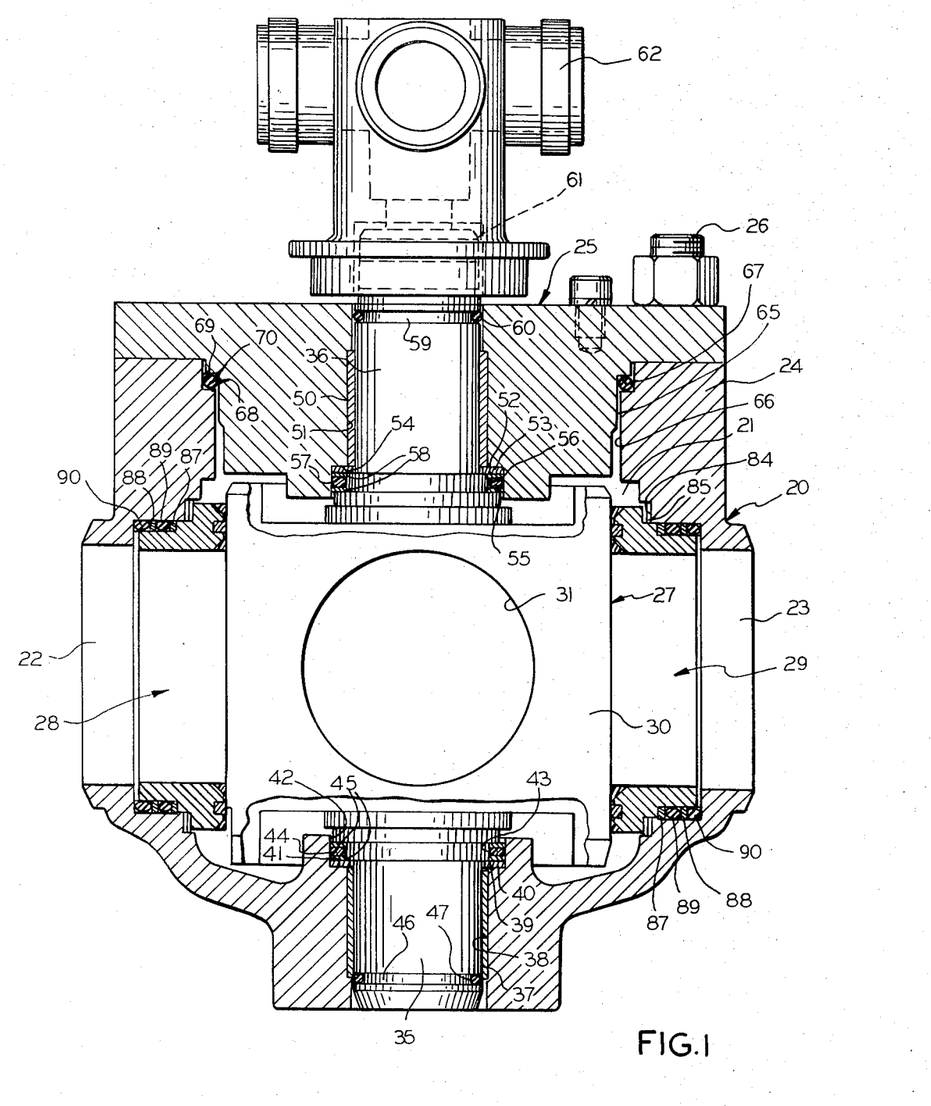
FIG. 1 is a vertical sectional view taken through the valve according to the present invention, showing some parts in full and broken-away parts for clarity and illustrating the position of the plug in closed position.

Referring to FIG. 1, the valve of this design includes a valve body 20 defining therein a valve cavity 21 and coaxially arranged inlet and outlet ports 22 and 23. It is readily apparent that the inlet port 22 could function as an outlet port if the outlet port 23 functioned as an inlet port, and this would depend upon the direction of flow through the valve. At the top of the valve body, a bonnet 24 is provided and closed by a cover 25 which is secured in place by nut and stud assemblies 26. Within the valve a plug 27 is rotatably mounted between the ports and coacts with seats 28 and 29 respectively at the inlet and outlet ports 22 and 23 for controlling the flow or fluid through the valve cavity and ports.

The plug 27 is cylindrical and provided with an outer cylindrical surface 30 which slidably engages the seats 28 and 29. A transaxially extending passageway or port 31 is provided in the plug and which aligns with the seats and ports so that intercommunication between the ports can be established when the axis of the passageway coaligns with that of the ports. The axis of the passageway extends perpendicular to the rotational axis of the plug. The vertical extent of the cylindrical plug surface 30 is such that it is slightly more than but at least as high as the seats so that the seats always engage the plug.

The plug is provided with a lower trunnion 35 and an upper trunnion 36. The lower trunnion is bearingly supported by a lower trunnion bearing 37 that is carried in a bore 38 at the lower end of the valve body. A shoulder 39 is formed above the trunnion for engaging a thrust bearing 40 bottomed on a shoulder 41 formed in the valve body and defined by a counterbore 42. Within the counterbore 42 and coacting with an O-ring groove 43 formed above the shoulder 39 of the plug is a sealing O-ring 44 sandwiched between a pair of par back rings 45. Adjacent the lower end of the trunnion 35, an O-ring groove 46 is provided to receive an O-ring 47 for inhibiting leakage between the trunnion and the lower trunnion bearing.

The upper trunnion 36 is bearingly received in an upper trunnion bearing 50 seated in a bore 51 of the cover 25. A shoulder 52 formed below the trunnion 36 bears against a thrust bearing 53 bottoming on a shoulder 54 formed in the cover 25. An O-ring groove 55 is formed below the shoulder 52 to coact with a counterbore 56 to receive an O-ring 57 sandwiched between a pair of par back rings 58. An O-ring groove 59 is formed at the upper end of the trunnion for receiving an O-ring 60 to coact with the bearing bore of the cover and inhibit leakage from the valve cavity. The upper end of the trunnion 36 includes a wrench stem 61 on which a removable wrench 62 may be mounted for rotational operation of the plug 30. Accordingly, the plug 30 is rotationally mounted in the valve body by trunnions bearingly supported in the lower end of the valve body and the cover for the bonnet.

The cover 25 includes a cylindrical portion 65 telescopically received within the bonnet bore 66. At the upper end of the cylindrical portion 65 a shoulder 67 is formed to coact with a shoulder 68 formed by the counterbore 69 in the bonnet to receive an O-ring seal 70 for defining a fluid-type relation between the cover and the bonnet. The diametrical size of the bonnet bore 66 is slightly larger than the diametrical size of the plug 30 to permit withdrawal of the plug through the bonnet when the cover is unbolted. Thereafter, the seats 28 and 29 can be removed for servicing. It should also be appreciated that the seals between the plug trunnions and the valve body and cover, as well as the bearings, may also be replaced or serviced as necessary when disassembling the valve. Such disassembly can be accomplished without removing the valve from the pipeline.

Any suitable fittings may be provided at the inlet and outlet ports to couple the valve into a pipeline.

The seats 28 and 29 are identical and therefore only one seat need be described. The details of the unique seat are shown particularly in FIGS. 2, 3, 4, 5 and 6. The seat in general includes a cylindrical rigid base of metal or other similar material 75, a resilient face 76 for engaging the plug, and bearing pads 77.

The base 75 may be made of any suitable rigid material, such as metals or plastics, while the resilient seal face may be made of any suitable material or synthetic rubber moldable and bondable to the base. Preferably, the material would be of about 70 durometer hardness. One suitable resilient material would be the one commercially available under the trademark "Hycar." The bearing pads are preferably made of a suitable rigid bearing material that will be softer than the material of the plug to minimize plug wear in the area of the bearing pads.

Figure 4:
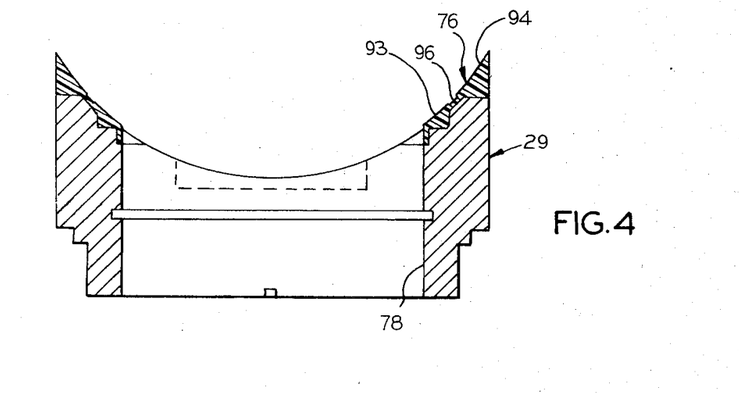
FIG. 4 is a sectional view of the seat taken generally along line 4—4 of FIG. 2.

The plug end of the seat is convexly or saddle shaped to the plug surface for mating therewith, as seen particularly in FIG. 4, while the opposite end is square. A bore or passageway 78 extends through the seat to coalign with the inlet and outlet ports, as seen particularly in FIG. 1. The size of the passageway is substantially the same as the diametrical size of the ports and also substantially the same as the passageay 31 extending through the plug.

Figure 3:
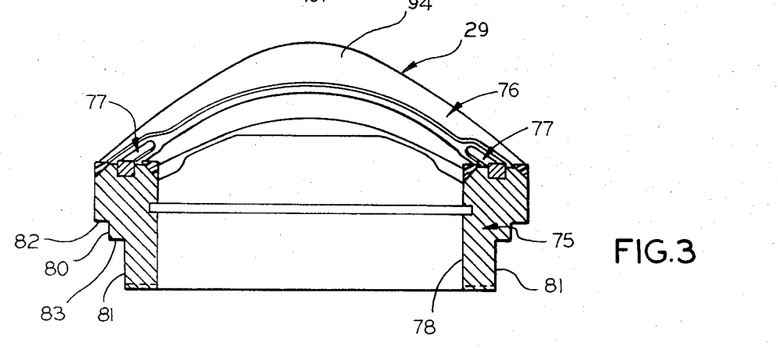
FIG. 3 is a sectional view of the seat taken generally along line 3—3 of FIG. 2.

The seat base 75 is diametrically reduced at 80 and again diametrically reduced at 81 to first define a shoulder 82 and second define a shoulder 83. The first shoulder 82 coacts with a shoulder 84 formed in the valve cavity adjacent the port for receiving a seat spring 85 in the form of a force member such as a wave spring, which produces initial biasing of the seat against the plug. The diametrically reduced portion 81 coacts with a counterbore 86 formed adjacent the port within the valve cavity to receive inner and outer seal rings 87 and 88 and inner and outer spacer rings 89 and 90 for providing a seal against leakage between the valve body and the seat.

Figures 5, 6, 7:
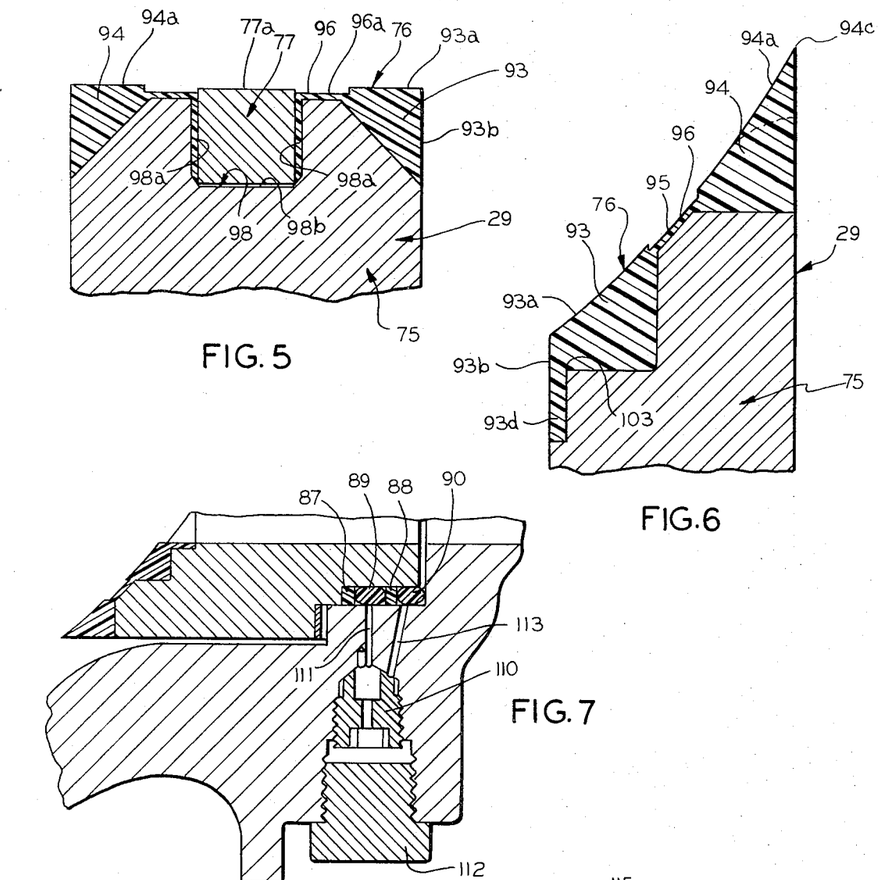
FIG. 5 is a greatly enlarged fragmentary sectional view of a part of the seat taken generally along line 5—5 of FIG. 2.
FIG. 6 is a greatly enlarged fragmentary sectional view taken generally along line 6—6 of FIG. 2.
FIG. 7 is a greatly enlarged fragmentary sectional view taken through a part of the valve and a seat showing one form of the lubrication system according to the present invention.

The seal face 76 includes inner and outer seal lips or seals 93 and 94 in spaced relation to define a groove or area 95 therebetween, as seen in FIG. 6. As also seen in FIG. 6, a layer 96 interconnects the inner and outer seal lips to provide a barrier between the base 75 and the plug. This layer also assists in maintaining an accurate seat closure gap or clearance with the plug to eliminate extrusion of the seal lips. The plug surfaces 93a and 94a, as well as the side surfaces 93b and 94b of the seal lips 93 and 94, are located precisely and consistently relative to the seals due to their being molded at the same time by a single mold element. The cross-sections of the lip seals, as seen in FIG. 5, are tapered into the center of the seat, thereby allowing a seal gradient to exist in the narrow width of the seals and into the center layer which makes feasible the high pressure sealing ability and practical the insertion of bearing pads. The surface 96a of the layer 96 is recessed from the seal surfaces 93a and 94a. Moreover, the surface of the layer 96 is recessed from the bearing surface 77a of the bearing pads 77, which in turn is recessed from the seal surfaces 93a and 94a. As seen in FIG. 5, the center layer of the seal face is extended into the bearing pad cavities 98 along the side walls 98a formed in the base 75. However, the center layer is terminated at the lower ends of the side walls so that it does not extend along the bottom wall 98b. In order to provide the proper height location of the bearing pads, they may be shimmed, if necessary, along the bottom wall 98b of the cavity.

Figure 2:
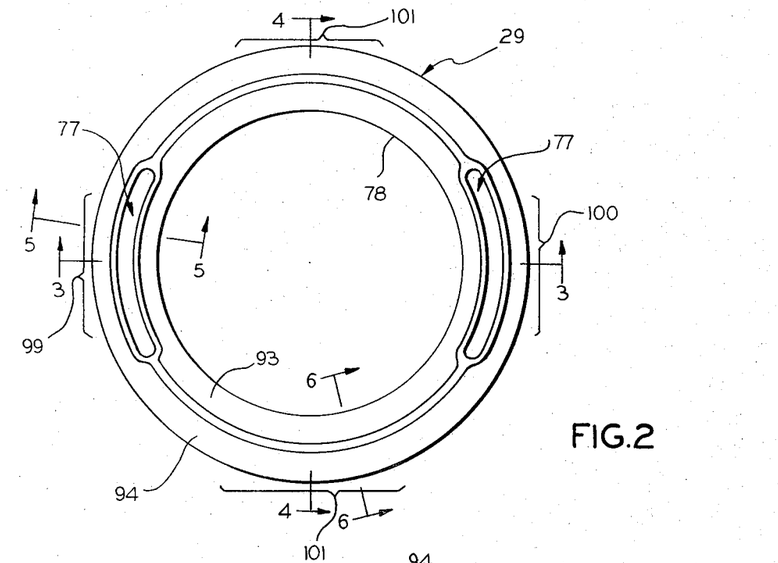
FIG. 2 is an end plan view of the seat utilized in the valve of the present invention.

As seen in FIG. 2, the seat 29 includes top, bottom and side sections 99, 100 and 101, respectively. The bearing pads 77 are located in the top and bottom sections wherein the surfaces of the bearing pads are always in engagement with the outer surface of the plug, inasmuch as the bearing pads seat above and below the passageway which extends through the plug. The crosssectional configuration of the top and bottom sections is essentially like that shown in FIG. 5, while the cross-sectional configuration of the side sections is essentially like that shown in FIG. 6, it being appreciated that the intermediate areas blend from one section to the other. When rotating the plug from open to closed position, the final closure area of the seal is along one of the side sections of the seat and it can readily be appreciated that after viewing FIGS. 5 and 6, the maximum cross-sectional area of the seal lips and the maximum surface area of the seal lips is positioned in the final closure area where they are required. Protection of the seal lips against damage is accomplished by the depth of the seal lip at the closure edge 93c. The inner diameter of the seal is skirted at 93d to strengthen the edge 93c. The rigid base beneath the seal face at this edge is provided with a corner 103 which prevents the plug from rolling the seal or prevents the pressure and velocity of the fluid from forcing the seal into the edge of the open port 31.

As above set forth, the bearing segments 77 are located in the top and bottom areas 99 and 100 of the seat and between the inner and outer seal lips 93 and 94 and accordingly are never directly exposed to the product flowing through the valve. The passageway or port 78 through the seal never crosses the bearing surfaces. This isolation of the bearing pads will enable them to remain substantially contamination-free. Moreover, it can be appreciated that because of the bearing pads the plug will require low operating torque for rotation consistently through the life of the valve, thereby enhancing valve actuation. The bearing pad cavities are sized to allow some longitudinal movement of the bearing insert so that they seek their proper position with respect to the plug.

From the foregoing it can be appreciated that the resilient faces of the seats are in constant contact with the plug, thereby preventing foreign matter from entering the seal surface areas. Both the outer and inner seal lips of the seats are maintained in engagement against the plug throughout the life of the valve. No crevices exist to accumulate scale or contamination. The inner sharp edge 93c of the inner seal lip 93 and the outer sharp seal edge 94c of the outer seal lip 94 function to provide a squeegee action during rotation of the plug from either direction to further assist in preventing the accumulation of further scale or contamination.

Figure 8:
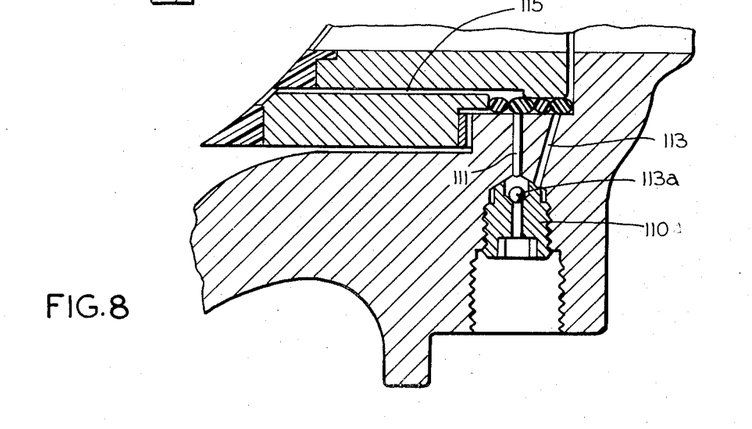
FIG. 8 is a view similar to FIG. 7 but showing another form of the lubrication system according to the present invention.

Optionally, a lubrication system, as illustrated in FIG. 7, may be employed, wherein a port selector 110 is threadedly received in a bore and in communication with a passageway 111 leading to the area between the externally arranged seal rings 87 and 88. A pipe plug 112 is first removed before application of lubricant through the port selector 110. Lubricant mechanically forces the seal rings 87 and 88 into sealing engagement with the valve body and seat surfaces. Additionally, seal construction with lubricant ports or passageways 115, as seen in FIG. 8, allows introduction of lubricant to breach surface discontinuities of the seal face that would form leakage passages. A force is also produced between the seal rings 87 and 88 which urges the seat toward the plug into engagement therewith. This force can be built up above line pressure to enhance the differential seat seal and force the valve to seal while in service. Lubrication in the valve body and seat cavity introduced through ports 115 will tend to prevent foreign materials or product from entering and further will insure that the seat and sealing rings will remain free and function as the seat is constructed to be actuated by differential pressure. In the event of disassembly of the valve, passageway 111 may be utilized to force lubrication into the body-seat cavity to effectively jack the seat out of the cavity. A further passageway 113 may also be used to jack the seat out of the cavity when lubrication is forced therethrough, especially for the structure of FIG. 8, where a ball 113a would be inserted in the port selector 110A to block the lubrication port to the body-seat cavity. It will be appreciated the ball 113a would be removed when lubricating through ports 115. Moreover, the port selector 110A would be backed off to allow access to passageway 113 when forcing lubrication therethrough.

Lubrication of the area between the plug and valve seat, when a valve has remained in open or closed position for a long period of time, will minimize damage of the valve from foreign materials and surface accumulations when actuated. The passageways 115 in the seat will also permit venting between the lip seals of the seat to the outside. Accordingly, passageways 115 provide double block and bleed action with a single seat.

Figure 9:
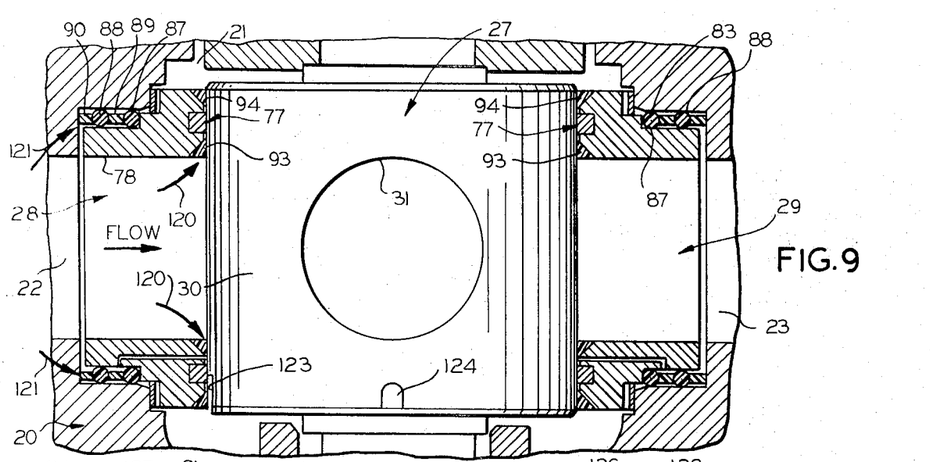
FIG. 9 is a fragmentary sectional view taken through the valve of the invention with the plug in closed position and illustrating with arrows one condition under which the valve operates and particularly the manner in which sealing is effected by the upstream seat.
Figure 11:
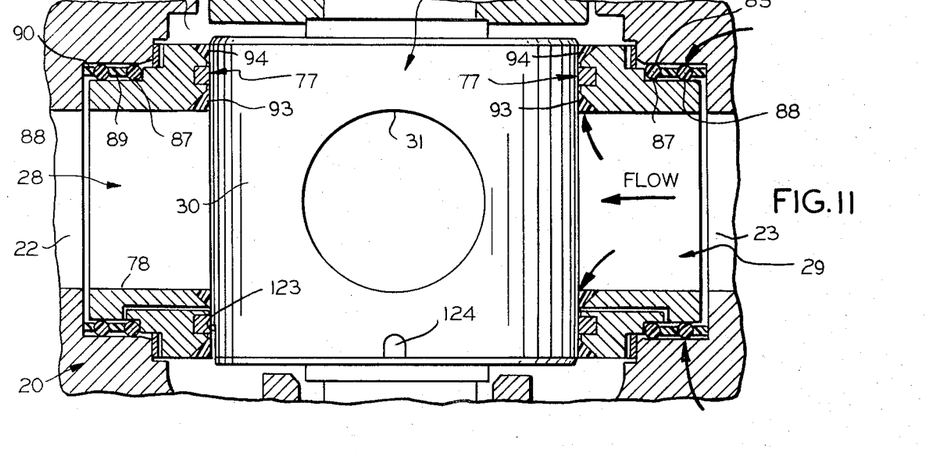
FIG. 11 is a view similar to FIGS. 9 and 10 but illustrating the sealing action when the pressure is encountered from the opposite direction.
Figure 12:
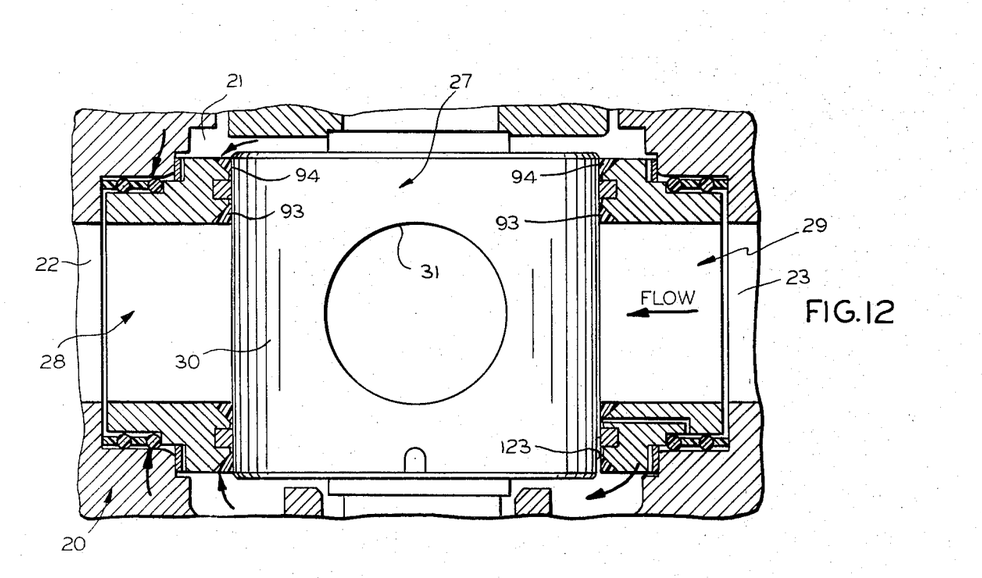
FIG. 12 is a view similar to FIGS. 9 to 11 but illustrating the situation where the right-hand seal leaks and in effect the opposite situation from that illustrated in FIG. 10.
Figure 13:
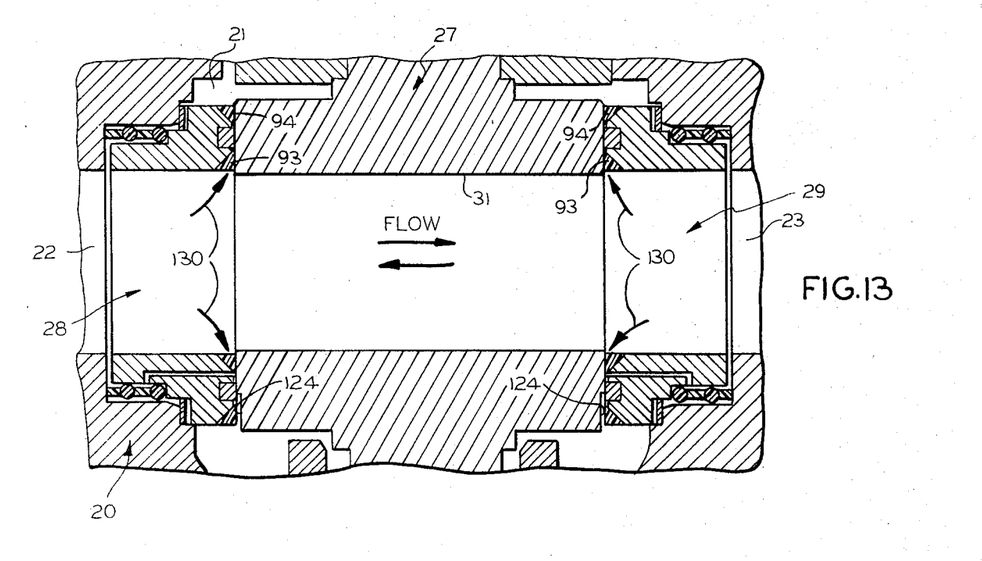
FIG. 13 is a view similar to FIGS. 9 to 12 except that the plug is shown in open position and illustrating the operation of the seals during flow in either direction.

Operation of the seats in conjunction with the plug for sealing the valve cavity can be further appreciated with reference to FIGS. 9 to 13. In FIG. 9 the inner or upstream seal lips 93 of each seat provide a double block feature. With flow coming from the left, pressure is exerted on seal lip 93 as indicated at the points identified by the arrows 120. Leakage is prevented between the valve body or cavity and the seat by the outer seal ring 88 at the points indicated by the arrows 121. Inasmuch as the fit of the seat 28 with respect to the seat cavity is such that liquid pressure will act against the left end of the seat 28 at the end wall 122 and against the outer O-ring 88, it results in an unbalanced force moving the seat against the plug into sealing engagement therewith. A bypass flat or depression 123 defining a passage on the outer surface of the plug at the lower end aligns with the outer seal lip 94 to vent the area between the seal lips and prevent pressure lock in the valve cavity. One downstream or outer seal lip will always be bypassed. Rotation of the plug 180° will bypass the outer seal lip on the opposite seat. Open bypass flats or depressions 124, FIG. 13, are aligned with the passageway extending through the plug on each side of the plug to prevent pressure from being trapped by the outer seal lips when the valve is open. The seat construction enables the valve to be used for block and bleed or double block and bleed service. In this connection a suitable drain is provided for the valve cavity.

Figure 10:
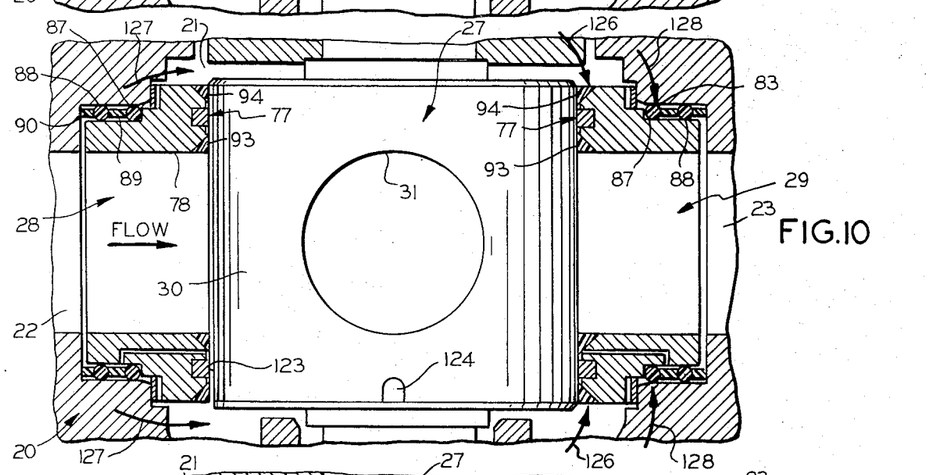
FIG. 10 is a view similar to FIG. 9 but illustrating the sealing with the valve body where leakage is encountered by the upstream seat and sealing is effected by the downstream seat.

In the event of leakage at the upstream or inner seal lip 93 where the flow enters the inlet port 22, the right-hand downstream seal or outer seal lip 94 seals, as shown in FIG. 10, at the points indicated by the arrows 126. Leakage then is considered to be by the seat 28 as indicated by the arrows 127. Accordingly, the outer seal lip 94 of the right seat 29 seals, while the inner seal ring 87 of the right seat seals at the points indicated by the arrows 128. During this condition the pressure applies a force against the shoulders 82 and 83 creating a differential in pressure and an unbalanced force moving the seat 29 against the plug into sealing engagement therewith.

Where the flow comes from the right side or through the port 23 as indicated in FIG. 11, the same upstream sealing action of the right seat 29 will be accomplished as was accomplished by the left seat 28 as shown in FIG. 9. Inasmuch as the bypass flat 123 is at the left seat 28, the right seat 29 seals along the upstream or inner seal lip 93.

Where the plug is rotated 180° so that the bypass flat 123, when the plug is in closed position, is at the right-hand seat 29, as seen in FIG. 12, and the right upstream or inner seal lip 93 leaks, the downstream or outer seal lip of the left seat will perform the sealing action as illustrated from the opposite side in FIG. 10.

When the plug is in open position, as shown in FIG. 13, both seats seal the body cavity with upstream sealing action that is sealing with the inner seal lips 93 at the points indicated by the arrows 130. The open bypass flats 124 prevent pressure from being trapped by the downstream or outer seal lips.

It can therefore be appreciated that the valve of the present invention, by having identical seats at both inlets, can perform block and bleed or double block and bleed service and will provide the maximum sealing availability against leakage where using resiliently faced seats.

It may be understood that modifications and variations may be effected without departing from the scope of the novel concepts of the present invention, but it is understood that this application is to be limited only by the scope of the appended claims, and could apply equally well to other valve designs.

The invention is hereby claimed as follows:

1. In a valve including a valve body defining a valve cavity, axially aligned inlet and outlet ports in the body communicating with said cavity, a plug rotatably mounted in the cavity on an axis perpendicular to the axis of said ports, said plug having a passageway extending transaxially therethrough which when aligned with the ports provides communication therebetween, and seats within the cavity at the ports coacting with the plug and body to define a seal between the plug and ports when the plug is in closed position, the improvement in the seats wherein each seat comprises a generally cylindrical rigid base having a passageway therethrough mating with a port, the axis of the seat extending perpendicular to the pivot axis of the plug and common with the port axis, the end of the seat coacting with the plug being arcuately formed on the same radius as the plug and having bonded thereon a resilient seal member, said seal member including inner and outer continuous spaced seal lips having ribbon-like sealing surfaces engaging the plug, and wear resistant load bearing insert means mounted at the end of the seat engaging the plug, said bearing insert means including a pair of inserts positioned between the inner and outer seal lips at diametrically opposed positions along the seat and aligned along the pivot axis of the plug above and below the plug passageway, each insert having a bearing surface slightly recessed from the sealing surfaces of said seal lips.

2. The seat as defined in claim 1, wherein the base is metal, the seal member is rubber, and the inserts are of a softer metal than the plug.

3. The seat as defined in claim 1, wherein each bearing segment is elongated and arcuately formed to the configuration of the seal lips.

4. The seat as defined in claim 1, wherein said seal lips have sharp edges along the sealing surfaces to wipe the plug during rotation thereof in both directions.

5. The seat as defined in claim 4, which further includes a thin layer of resilient material interconnecting between said seal lips, and the outer surface of said layer being recessed from the sealing surfaces of the seal lips.

6. The seat as defined in claim 5, wherein the outer surface of said layer is recessed from the bearing surface.

7. The seat as defined in claim 5, wherein the cross-sections of the seal lips are thicker at the outer edges and tapered into the center of the seal member.

8. The seat as defined in claim 7, wherein the rigid base includes a corner beneath the inner lip seal to prevent distortion of the seal during rotation of the plug.

9. In a valve including a valve body having an inlet port and an outlet port axially aligned therewith, a plug rotatable in the body between the ports along an axis perpendicular to the axis of the ports and having a transaxially extending passageway therethrough which when aligned with the inlet and outlet ports provides communication therebetween, and seats within the body at the inlet and outlet ports coacting with the plug to define a seal between the plug and ports, the improvement in the seats each of which comprises a rigid base in the form of an annulus, one end of said base being convexly formed to mate with said plug when a center axis through the seats extends perpendicular to the rotational axis of the plug, an elastomer face bonded to said one end including inner and outer seals interconnected by a thin section, said seals having outer surfaces for sealing engagement with the plug, and a pair of rigid bearing inserts engaging the plug and protecting the seals from excessive distortion and wear, said inserts being positioned between the inner and outer seals and on opposed sides of the seats above and below the plug passageway in alignment with the pivot axis of the plug, each insert having a bearing surface slightly recessed from the outer surfaces of said seals in their relaxed state.

10. A valve comprising a valve body defining a valve cavity, axially aligned inlet and outlet ports in the body communicating with said cavity, a cylindrical plug rotatably mounted in the cavity on an axis perpendicular to the axis of said ports, said plug having a passageway extending transaxially therethrough which when aligned with the ports provides communication therebetween, seats within the cavity at the ports coacting with the plug and body to define a seal between the plug and ports when the plug is in closed position, each seat including a generally cylindrical rigid base having a passageway therethrough mating with a port, the axis of the seat extending perpendicular to the pivot axis of the plug and common with the port axis, the end of the seat coacting with the plug being arcuately formed on the same radius as the plug and having bonded thereon a resilient seal member, said seal member including inner and outer continuous spaced seal lips having ribbon-like sealing surfaces engaging the plug, said spaced seal lips defining a circumferential space bounded by the seal lips and the plug surface, and passage means on the plug connecting said circumferential space and the valve cavity.

11. The plug valve defined in claim 10, which further includes sealing means between the seats and valve body, wherein said sealing means define inner and outer annular cavities between said seats and valve body, said cavities being separated by an annular seal member.

12. The plug valve defined in claim 11, wherein said sealing means includes O-rings.

13. The valve as defined in claim 11, wherein said sealing means includes ring-shaped members.

14. The valve defined in claim 11, wherein at least one of said seats includes passage means connecting said inner annular cavity and said circumferential space.

15. The valve defined in claim 14, containing additional passage means connecting said inner annular cavity and the valve exterior.

16. The valve defined in claim 15, containing additional passage means connecting said outer annular cavity and the valve exterior.

17. The valve defined in claim 16, wherein the additional passage means connecting the inner and outer annular cavities and the valve exterior are selectably controlled.

18. The plug valve defined in claim 11, wherein each seat further includes metal bearing insert means mounted in said one end for engaging the plug and having a bearing surface slightly recessed from the sealing surfaces of said seal lips.

19. The plug valve defined in claim 13, which further includes spring means between the body and seats biasing same toward the plug.

20. The plug valve defined in claim 18, wherein the bearing insert means includes a pair of bearing pads, said pads positioned within said seat to be in continuous contact with said plug surface throughout plug rotation.

21. The plug valve defined in claim 15, wherein the seats are formed such that line pressure forces the seats into sealing contact with the plug.

22. The valve as defined in claim 20, wherein the bearing pads are positioned such that said inlet and outlet ports do not communicate with said bearing pads.

23. The plug valve defined in claim 10, wherein said passage means is defined by a depression formed on the plug.

24. The plug valve defined in claim 10, wherein the passage means is positioned to align with and communicate the valve cavity to the space between the seal lips of one of the seats when the plug is in closed position.

25. The plug valve defined in claim 10, wherein said passage means is defined by depressions on the plug which align with the seats when the plug is in open position and a depression which aligns with one seat when the plug is in closed position.

26. The plug valve defined in claim 16, wherein the cross-sections of the seal lips are thicker at the outer edges and tapered into the center of the seal member.

* * * * *